United States Patent
Riedel

(10) Patent No.: US 10,272,834 B2
(45) Date of Patent: Apr. 30, 2019

(54) READING LIGHT ASSEMBLY AND READING LIGHT SYSTEM FOR A VEHICLE

(71) Applicant: Airbus Operations GmbH, Hamburg (DE)

(72) Inventor: Christian Riedel, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 0 days.

(21) Appl. No.: 14/867,173

(22) Filed: Sep. 28, 2015

(65) Prior Publication Data

US 2016/0090031 A1 Mar. 31, 2016

(30) Foreign Application Priority Data

Sep. 29, 2014 (EP) .................................... 14186832

(51) Int. Cl.
| | |
|---|---|
| *B60Q 3/44* | (2017.01) |
| *B64D 11/00* | (2006.01) |
| *B60Q 3/47* | (2017.01) |

(52) U.S. Cl.
CPC ................. *B60Q 3/44* (2017.02); *B60Q 3/47* (2017.02); *B64D 11/00* (2013.01); *B64D 2011/0053* (2013.01); *Y02T 50/46* (2013.01)

(58) Field of Classification Search
CPC ...... B60Q 3/001; B60Q 3/005; B60Q 3/0203; B60Q 3/0206; B60Q 3/0253; B60Q 3/0259; B60Q 3/0266; B60Q 3/0286; B60Q 3/0296; B60Q 3/44; B60Q 3/47; B60Q 3/51; B60Q 3/76; B60Q 3/80; F21V 19/02; F21V 21/30; F21V 23/0435; F21V 21/14; F21V 21/15; B64D 2011/0038; B64D 2011/0053; F21S 2/005; F21S 8/04;

(Continued)

(56) References Cited

U.S. PATENT DOCUMENTS

| | | | |
|---|---|---|---|
| 6,203,180 B1* | 3/2001 | Fleischmann | B64D 11/00 362/147 |
| 6,796,690 B2* | 9/2004 | Bohlander | B60Q 3/001 362/470 |

(Continued)

FOREIGN PATENT DOCUMENTS

| | | |
|---|---|---|
| EP | 2439105 | 4/2012 |
| EP | 2546102 | 1/2013 |

(Continued)

OTHER PUBLICATIONS

European Search Report, dated Apr. 20, 2015.

*Primary Examiner* — Hargobind S Sawhney
(74) *Attorney, Agent, or Firm* — Greer, Burns & Crain, Ltd.

(57) ABSTRACT

A reading light assembly for a vehicle comprising a mounting element and a lamp housing. The mounting element is adapted to mount the reading light assembly in a vehicle. The lamp housing includes a light source and is mounted to the mounting element such that it can be rotated about a first axis with respect to the mounting element and tilted about a second axis with respect to the mounting element. The reading light assembly further comprises a first actuating device for rotating the lamp housing about the first axis and a second actuating device for tilting the lamp housing about the second axis.

10 Claims, 4 Drawing Sheets

(58) Field of Classification Search
CPC . F21Y 2103/10; F21Y 2105/10; H05B 37/02; H05B 37/0227; H05B 37/0245
See application file for complete search history.

(56) References Cited

U.S. PATENT DOCUMENTS

| | | | | |
|---|---|---|---|---|
| 7,253,744 | B2* | 8/2007 | Colacecchi | B64D 11/00 340/686.1 |
| 7,837,364 | B2* | 11/2010 | Budinger | B64D 47/02 362/470 |
| 8,325,023 | B2* | 12/2012 | Kohlmeier-Beckmann | B64D 11/00 340/286.06 |
| 2005/0044275 | A1* | 2/2005 | Adamson | H04L 41/00 709/253 |
| 2006/0032979 | A1* | 2/2006 | Mitchell | B64D 11/00 244/118.6 |
| 2007/0145915 | A1* | 6/2007 | Roberge | F21K 9/00 315/312 |
| 2008/0055836 | A1* | 3/2008 | Lamoree | B64D 11/003 361/837 |
| 2010/0091503 | A1 | 4/2010 | Kuo | |
| 2012/0087142 | A1 | 4/2012 | Schultheis et al. | |
| 2012/0292986 | A1 | 11/2012 | Riedel et al. | |
| 2013/0027954 | A1 | 1/2013 | Boomgarden et al. | |
| 2014/0029262 | A1 | 1/2014 | Maxik et al. | |

FOREIGN PATENT DOCUMENTS

| | | |
|---|---|---|
| WO | 2011082998 | 7/2011 |
| WO | 2013027852 | 2/2013 |

\* cited by examiner

READING LIGHT ASSEMBLY AND READING LIGHT SYSTEM FOR A VEHICLE

CROSS-REFERENCES TO RELATED APPLICATIONS

This application claims the benefit of the European patent application No. 14186832.3 filed on Sep. 29, 2014, the entire disclosures of which are incorporated herein by way of reference.

BACKGROUND OF THE INVENTION

The present invention relates to a reading light assembly for a vehicle comprising a mounting element and a lamp housing. The mounting element is adapted for mounting the reading light assembly in a vehicle. The lamp housing includes a light source and is mounted to the mounting element such that it can be rotated about a first axis with respect to the mounting element and tilted about a second axis with respect to the mounting element. The invention further relates to a reading light system and an aircraft comprising a reading light system.

Reading light assemblies or, in short, reading lights for passengers traveling in public transport vehicles such as trains or aircraft are well known in the prior art. Similar reading lights are also known, for example, from cars. The reading lights are usually installed over each seat to provide individual lighting for a person sitting in the seat. A control is provided either directly at the reading lights or at the seats which a passenger can use to switch the light on or off. Onboard aircraft the reading lights are often installed in so-called passenger service units (PSU) which additionally comprise, for example, speakers and oxygen supply masks.

At least onboard aircraft and in trains, passengers can only control the reading light by switching it on or off. It is, in particular, usually not possible to alter the direction of the cone of light of the reading lights, i.e., its focus. However, altering the direction of the reading light is often requested by passengers to optimize the illumination of, e.g., books or to avoid disturbing other passengers. Past experience has, however, shown that providing vehicles with adjustable reading lights that can be manually adjusted by passengers increases the workload for the operating personnel of the vehicle considerably as all reading lights have to be re-adjusted after each trip. Therefore, commonly reading lights cannot be adjusted by passengers. Hence, there appears to be a needed to provide reading lights that can be adjusted by passengers without making it necessary that they are moved back to a default position one by one.

Even when the reading lights cannot be adjusted by passengers, during assembly of an aircraft, for example, in the final assembly line, and every time an aircraft has undergone major maintenance operations in the cabin, all reading lights have to be adjusted manually. To adjust the orientation of the reading lights a cover from the PSU has to be removed, every reading light has to be adjusted using a special tool, and the cover has to be put back into place afterwards. Considerable amounts of manual labor time are required only for adjusting the orientation of the reading lights. Hence, there also appears to be a need to improve the positioning of the reading lights during manufacture and after maintenance of aircraft cabins.

SUMMARY OF THE INVENTION

In a first aspect, the problem is solved by a reading light assembly comprising a first actuating device for rotating the lamp housing about a first axis and a second actuating device for tilting the lamp housing about a second axis.

The reading light assembly, according to the present invention, comprises a mounting element for attaching the reading light assembly, for example, to a wall, a ceiling or an overhead compartment of a passenger cabin of the vehicle. The vehicle can be, for example, an aircraft, a passenger train or a bus. The mounting assembly holds a lamp housing in which a light source is arranged. The light source can, for example, be a conventional light bulb or, preferably, a light source comprising a light emitting diode. In exemplary embodiments, the lamp housing further comprises a focusing arrangement to focus the light emitted by the light source to a defined cone. Thereby, the reading light can be used to selectively illuminate specific regions or areas only.

The lamp housing can be rotated and tilted with respect to the mounting element about a first and a second axis, respectively. In other words, the orientation of the cone of light emitted by the light source in the lamp housing can be changed by rotating or tilting the lamp housing. The first and/or the second axis are not necessarily fixed with respect to the mounting element. For example, when rotating the lamp housing about the first axis, the second axis about which the light housing is tilted may rotate with the light housing. In an exemplary preferred embodiment, the first axis extends perpendicular to the second axis and when rotating the lamp housing about the first axis, the second axis moves in a plane that extends perpendicular to the first axis. The terms rotate and tilt as used herein do not necessarily refer to different kinds of movement but are only used to differentiate the movement about the first axis from movement about the second axis.

The reading light assembly comprises a first actuating device for rotating the lamp housing about the first axis and a second actuating device for tilting the lamp housing about the second axis. An actuating device can be any kind of powered arrangement configured to move the lamp housing with respect to the mounting element in form of a rotational movement. The term actuating device implies that an automated or externally controlled movement of the lamp housing is possible. It does not refer to, for example, a gripping surface which a person can touch to manually rotate or tilt the lamp housing.

The reading light assembly, according to the present invention, advantageously allows controlling an orientation of the light housing of the reading light assembly with respect to the mounting element. As the mounting element is rigidly attached to a vehicle, by changing the orientation of the reading light, different areas or spots can be illuminated with the same reading light. Providing actuating devices that facilitate rotation about a first axis and tilting about a second axis, respectively, allows for a central control of the orientation or position of the light emitted by the light source arranged inside the lamp housing. As will be described in the following paragraphs in more detail, the reading light assembly according to the present invention allows, for example, providing each passenger seat with a control configured to control an orientation of a specific reading light assembly assigned to this seat. Every time a passenger using the passenger seat changes, the orientation of the lamp housing can, for example, advantageously be reset to a default position or reset position from a central control unit. Furthermore, when installing reading lights onboard a vehicle, or after maintenance, the orientation of the reading lights does not have to be adjusted manually. A central control unit can be provided which automatically adjusts the orientation or position of the respective reading light.

In a preferred embodiment the reading light assembly comprises a spacer ring mounting the lamp housing to the mounting element. The first actuating device is adapted for rotating the spacer ring about the first axis, whereby the lamp housing is rotated about the first axis. The second actuating device is adapted for tilting the lamp housing with respect to the spacer ring about the second axis. The spacer ring, according to the present invention, provides a connection between the mounting element and the lamp housing. By providing the spacer ring, the lamp housing itself only needs to be tilted about the second axis, whereas the rotation of the lamp housing about the first axis is performed by rotating the combination of the spacer ring and the lamp housing about the first axis. Hence, each of the actuation devices only needs to be able to accommodate rotation about one axis.

In a further preferred embodiment the reading light assembly comprises a third and a fourth actuating device, wherein the third actuating device is adapted for rotating the lamp housing about the first axis and the fourth actuating device is adapted for tilting the lamp housing about the second axis. In this preferred embodiment additional actuating devices are provided for supporting a rotation about the first and the second axis. The third actuating device can, for example, be arranged on the opposite side of the spacer ring from the first actuating device. By providing a synchronized operation of the first and the third actuating device, sufficient torque can be made available for rotating the lamp housing about the first axis. Hence, each of the actuating devices can either be small as it needs to provide less torque, or if each of the actuating devices provides sufficient torque on its own, a redundant system is provided. If one of the first and the third actuating device fails, the other of the first and the third actuating device can still rotate the lamp housing about the first axis. Similarly, providing two actuating devices for tilting the lamp housing about the second axis can either be used to provide more torque or to provide redundant operation.

It is further preferred that the first and/or the third actuating device are each formed by a rotation coil and a plurality of magnetic strips. The rotation coil is firmly attached to one of the mounting element and the spacer ring and the magnetic strips are firmly attached to the other of the mounting element and the spacer ring. The reading light is adapted such that an alternating magnetic field for rotating the spacer ring about the first axis can be generated with the rotation coil or the rotation coils.

In this preferred embodiment of the reading light assembly the first and, if available, the third actuating device are formed by a specific kind of electro motor. Essentially, one of the mounting element and the spacer ring forms the permanent magnet part of the respective actuating device, whereas the other of the mounting element and the spacer ring is the alternating magnet of the electro motor. The magnetic strips of each of the actuating devices can, for example, be arranged at the same radial distance from the first axis. In this preferred embodiment no mechanical parts are required for rotating the lamp housing about the first axis. Thus, the risk of failure due to wear is considerably reduced.

Alternatively or additionally, the second and/or the fourth actuating device each comprise a tilting coil and a plurality of magnetic strips. The tilting coil is firmly attached to one of the spacer ring and the lamp housing and the magnetic strips are firmly attached to the other of the spacer ring and the lamp housing. The reading light assembly is adapted such that an alternating magnetic field for tilting the lamp housing about the second axis can be generated by the tilting coil or the tilting coils. Forming the second and, where available, the fourth actuating device also from magnetic strips and a tilting coil has the same advantages as providing the first and/or the third actuating device in the same manner.

In a preferred embodiment the lamp housing has an at least partially spherical form. Providing the lamp housing with an at least partially spherical form, i.e., a form that follows at least partially, for example, in one plane, a radius of a circle, facilitates a rotation of the lamp housing with respect to the mounting element or, if available, the spacer ring. The lamp housing can, for example, be formed as a part of a sphere having its origin at a point where the first and the second axes intersect. Thereby, the lamp housing can be rotated about the first axis and tilted about the second axis about a solid angle defined by the spherical part of the lamp housing.

It is further preferred that at least one actuating device is formed as an electrically powered step motor. Electrically powered step motors are available in all sizes. As only little torque is required to rotate the lamp housing, micro step motors can be used, for example, as actuating devices for rotating and tilting the lamp housing. Such micro step motors are very small and require only little power. Please note that the preferred embodiments described in the preceding paragraphs using coils and magnetic strips for providing actuating devices form one kind of electrically powered step motor.

In another preferred embodiment the reading light assembly comprises at least one reading light control unit. The reading light control unit is adapted to control the actuating devices to rotate the lamp housing about the first axis or to tilt the lamp housing about the second axis. Providing an independent control unit for the reading light assembly improves the design options both for developers of the reading light assembly and a central control unit for reading light systems or other control units communicating with the reading light assembly. Both systems only need to adhere to one communication standard, whereas the actual design of the reading light assembly does not need to be known to developers of external devices. Thus, the reading light units can, for example, be exchanged to updated models without requiring an overhaul of a central control unit as long as the control units of the reading light assembly meet predefined communication standards.

In a further preferred embodiment the reading light assembly comprises a sensor. The sensor is adapted for determining a position of a seat to be lighted by the reading light assembly. The sensor can, for example, be an optical sensor or an ultrasound sensor. By providing a sensor that can be used to determine a position of a seat to be lighted by the reading light assembly, advantageously an automated mechanism can be provided that determines under which angle the lamp housing needs to be rotated and/or tilted such that the seat to be illuminated is actually illuminated. Thus, advantageously an exemplary central control unit and does not need to comprise information for each reading light assembly under which angles the respective reading light assembly needs to be rotated and/or tilted to light the respective seat. To reset a reading light assembly to a default position, only a reset command needs to be sent to the reading light assembly.

It is preferred that the reading light assembly comprises an interface for connecting the reading light assembly to a central control unit of a reading light system for a vehicle. Preferably the interface is a bus interface and even more preferably a wireless interface. As already described in the preceding paragraphs, providing an interface for connecting the reading light assembly to a central control unit allows controlling the reading light assembly from a central control unit, for example, for resetting the orientation of the lamp housing to a default position. Furthermore, a control unit of a reading light system would not require any specific information about the design of the reading light assembly but only needs to provide either a reset command or the angles by which the lamp housing is to be rotated and or tilted. Finally, providing a wireless interface reduces the wiring required which may result in a weight and cost reduction. Furthermore, if a reading light assembly is replaced, no re-wiring is required.

In a second aspect, the problem underlying the present invention is solved by a reading light system for a vehicle comprising a plurality of reading light assemblies according to one of the preceding preferred embodiments and a central control unit. The central control unit is functionally connected to each of the reading light assemblies and adapted for controlling the actuating devices of each reading light assembly to rotate the lamp housing of the respective reading light assembly about the first axis or to tilt the lamp housing of the respective reading light assembly about the second axis.

The reading light system according to the present invention comprises at least one central control unit. The central control unit can, for example, be part of a central or local computing system of an aircraft which is, in turn, controlled by a flight attendant panel. However, it can also be a distinct control unit that is only used for controlling the reading light system of the vehicle. The central control unit is functionally connected to each of the reading light assemblies. A functional connection is any connection between the central control unit and a reading light assembly through which a command can be transmitted from the central control unit to the reading light assembly. However, this does not require that the original command of the central control unit is actually received by the reading light assembly. It is also possible that the command is received by intermediate control units and translated, for example, into discrete signals which directly affect the actuating devices, wherein each discrete signal leads to a rotation or tilting of the lamp housing about a predefined angle.

The central control unit can be adapted, for example, by installing software on the central control unit that carries out commands or by providing hardware interfaces for connecting the central control unit to the reading light assemblies. By enabling the central control unit to control the actuating devices such that it can rotate or tilt the lamp housing of the individual reading light assemblies, the orientation of the reading light assemblies can be modified without requiring manual correction of each reading light. For example, after all passengers have left an aircraft, the central control unit can instruct all the reading light assemblies to move back to a default position. Likewise, when reading light assemblies have been newly installed or been subject of maintenance, they do not have to be adjusted manually but can be adjusted automatically from the central control unit.

In a preferred embodiment, the central control unit is adapted to control the actuating devices of each reading light assembly to rotate the lamp housing of the respective reading light assembly to an individual default position. Thus, the central control unit can advantageously rotate and tilt the lamp housing in each reading light assembly to a default position after the orientation of the lamp housing has been changed, for example, during maintenance or by a passenger.

It is further preferred that the central control unit is functionally connected to a plurality of sensors. The system is adapted to determine for each of the reading light assemblies a position of a seat to be lighted by the respective reading light assembly using signals provided by at least one of the plurality of the sensors. The system is further adapted to determine for each of the reading light assemblies the individual reset position from the position of the seat determined for the respective reading light assembly.

In the preferred embodiment the control unit is connected to a plurality of sensors. The sensors may, for example, be optical or ultrasound sensors and can be attached to each reading light assembly or, for example, to each PSU comprising a plurality of reading light assemblies. It is also possible, that the sensors are arranged spaced apart from the reading light assemblies or passenger service units as long as they can be used to determine a position of a seat to be lighted by a specific reading light assembly.

The entire reading light system is adapted to determine for each reading light assembly a position of a seat to be lighted by the respective reading light assembly. The position is determined based on signals of the sensor. The position determining can be performed either directly by the sensor, by the central control unit or, for example, by the reading light assemblies themselves if they comprise a reading light control unit.

By providing sensors to determine a position of a seat to be lighted by a specific reading light assembly, the angle to which the lamp housing of the respective reading assembly has to be rotated such that it is in a default position does not have to be determined in advance and stored on some kind of memory but can be determined automatically for each seat. Thereby, the system can be the used for different arrangements of seats in a passenger cabin of a vehicle. Furthermore, the sensors can advantageously be used to determine if a seat is occupied or not, whereby, for example, a crew of an aircraft can automatically determine if all passengers that are supposed to be on board are actually on their seats.

In a further preferred embodiment the system comprises a user control for each of the reading light assemblies. The system is adapted such that each user control can instruct actuating devices of one reading light assembly of the plurality of reading light assemblies to rotate the lamp housing of the respective reading light assembly about the first axis or tilt the lamp housing about the second axis. By providing such a control, a passenger of a vehicle can, advantageously, control which part of his seat or space is lighted by the reading light assembly.

In addition to the specific advantages of the different embodiments of reading light systems according to the present invention each of the system additionally shares the advantages of the reading light assemblies installed therein.

In a third aspect the problem is solved by an aircraft comprising a reading light system according to one of the preceding preferred embodiments. The aircraft shares the advantages of the respective embodiments of the reading light system according to the present invention used on board the aircraft.

BRIEF DESCRIPTION OF THE DRAWINGS

The present invention will now be described in more detail with reference to the drawings showing preferred exemplary embodiments of reading light assemblies and reading light systems according to the present invention, wherein.

In the drawings like elements of the different embodiments are designated with like reference numerals.

DETAILED DESCRIPTION OF THE PREFERRED EMBODIMENTS

Figure 1:
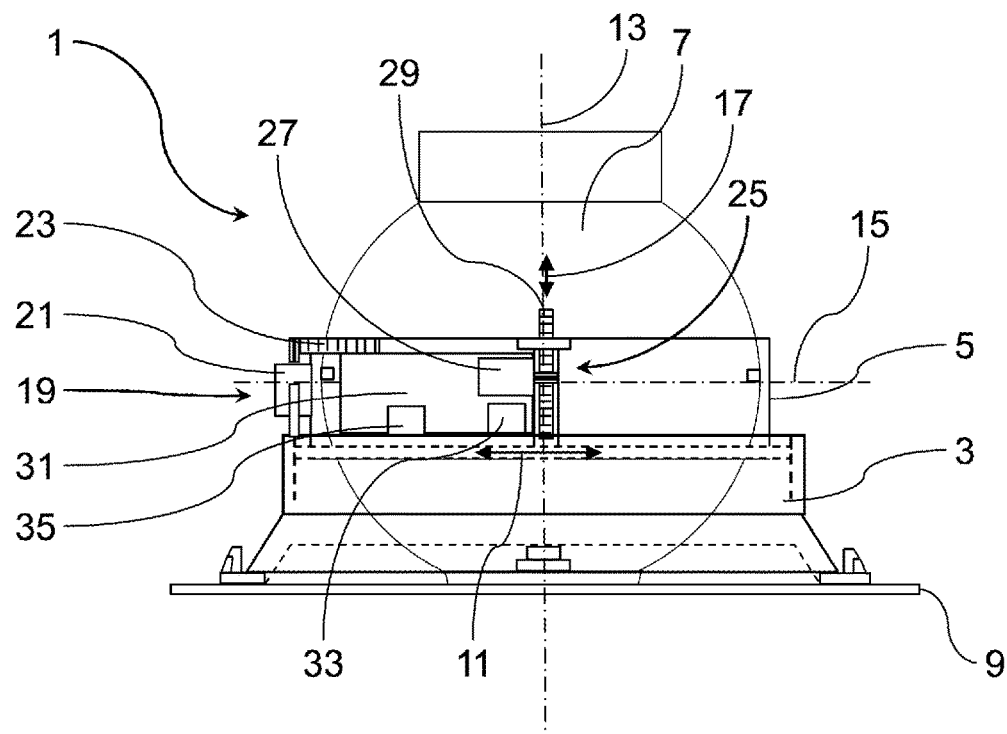
FIG. 1 shows a schematic side view of a first exemplary embodiment of a reading light assembly according to the present invention.
Figure 2:
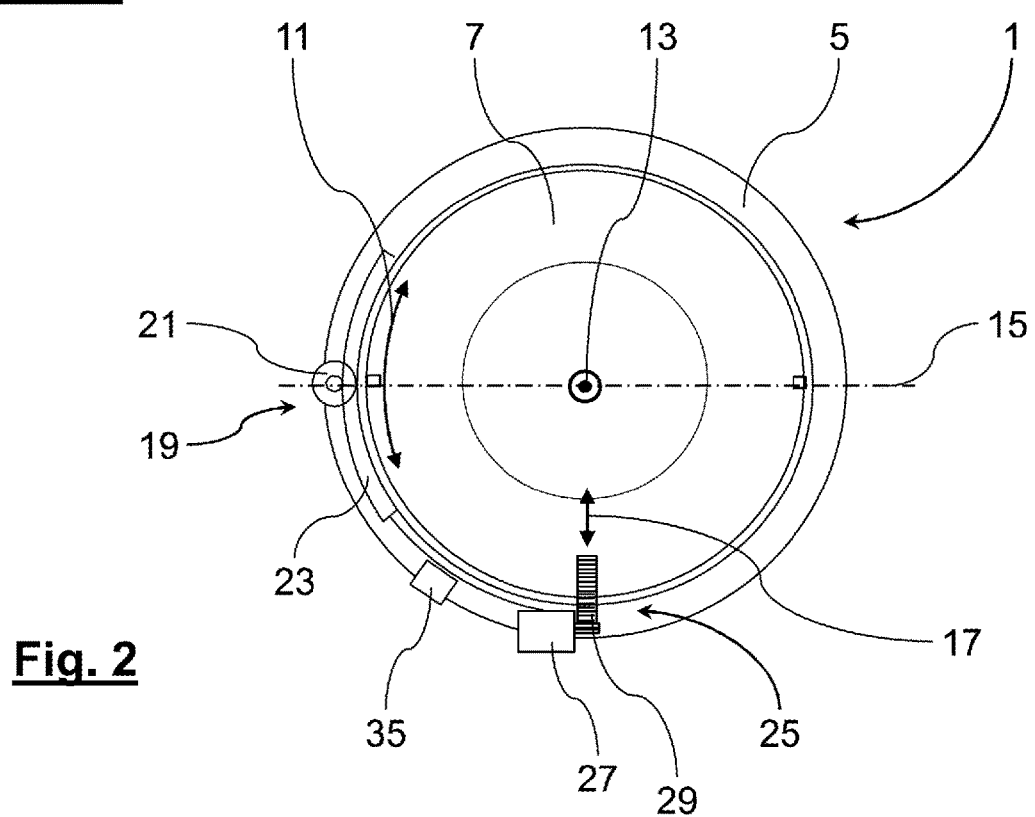
FIG. 2 shows a schematic top view of the reading light assembly of FIG. 1.

In FIGS. 1 and 2 a first embodiment of a reading light assembly 1 is shown. The reading light assembly 1 comprises a mounting element 3, a spacer ring 5 and a lamp housing 7. In FIG. 1 the mounting element 3 is attached or mounted to a front plate 9 of a PSU arranged in a passenger cabin of an aircraft. The mounting element 3 and the front plate 9 are not shown in FIG. 2. The passenger cabin, the aircraft and the PSU are not shown in further detail in the Figures. The mounting element 3 is not only adapted for attaching the reading light assembly 1 to the vehicle, but also holds the spacer ring 5 which in turn holds the lamp housing 7. A light source, for example, a light emitting diode, is arranged in the lamp housing 7 but not shown in the Figures. Apart from housing the light source, the lamp housing 7 also provides an arrangement for focusing the light emitted from the light source such that a selected area can be illuminated using the reading light assembly 1.

The spacer ring 5 is mounted to the mounting element 3 such that it can be rotated in a first rotation direction 11 about a first axis 13. The lamp housing 7 is mounted to the spacer ring 5 such that it rotates together with the spacer ring 5 about the first axis 13. Hence, the spacer ring 5 provides a first degree of rotational freedom for the lamp housing 7 with respect to the mounting element 3 and the front plate 9 of the PSU.

A second degree of rotational freedom is provided by the mounting of the lamp housing 7 in the spacer ring 5. The lamp housing 7 can be rotated with respect to the spacer ring 5 about a second axis 15 in a second rotation direction 17. The second axis 15 extends perpendicular to the first axis 13. When the spacer ring 5 is rotated with respect to the mounting element 3, the second axis 15 is also rotated. However, it always remains in a plane that is perpendicular to the first axis 13. In the exemplary embodiment shown in FIGS. 1 and 2, the lamp housing 7 can be rotated with respect to the mounting element 3 by approximately +/−45° about the first axis 13 and by approximately +/−45° about the second axis 15. As can be seen in FIGS. 1 and 2, the lamp housing 7 is of a partially spherical shape such that it can be rotated about the first and the second axis 13, 15.

The reading light assembly 1 further comprises a first actuating device 19 for rotating the lamp housing 7 together with the spacer ring 5 about the first axis 13. The first actuating device 19 comprises an electrically powered micro stepper motor or micro step motor 21 which is firmly attached to the mounting element 3 and a crown gear 23 which is firmly attached to the spacer ring 5. The micro step motor 21 is in engagement with the crown gear 23 for rotating the spacer ring 5 about the first axis 13.

A second actuating device 25 also comprising an electrically powered step motor 27 and crown gear 29 is further provided for rotating the lamp housing 7 about the second axis 15. The step motor 27 is firmly or rigidly attached to the spacer ring 5 such that it rotates with the spacer ring 5 about the first axis 13. The crown gear 29 is firmly attached to the lamp housing 7 which is at least in this region of spherical shape. The step motor 27 is in engagement with the crown gear 29 such that the second actuating device 25 can be used to rotate the lamp housing 7 about the second axis 15.

The reading light assembly 1 shown in FIGS. 1 and 2 advantageously allows adjustment of the orientation of the lamp housing 7 with respect to the mounting element 3 and, thereby, the direction of the light cone emitted by the reading light assembly 1 using an external control that is adapted to control the first and the second actuating device 19, 25. Thereby, passengers can individually adjust the area lighted by the reading light assembly 1 without having to touch the actual reading light 1. Furthermore, if a reading light should, for example, after use by a passenger, not be in a default or standard position, a central control unit can be used to readjust the position of the reading light 1. In addition, when reading light assemblies 1 are installed during assembly, for example, in an aircraft cabin, they do not have to be adjusted manually but can be adjusted from a central control unit by a single command. Thus, the installation time for reading light assemblies 1 can be reduced.

The reading light assembly 1 shown in FIG. 1 further comprises a printed circuit board 31 with a reading light control unit 33. Providing a printed circuit board 31 comprising a local reading light control unit 33 directly at the reading light assembly 1 is particularly advantageous if the reading light assembly 1 is used for retro-fitting existing aircraft as the PSU does not have to be exchanged or modified if the reading light control units 33 provide all necessary functions and are directly connected to the aircraft's bus system.

The reading light control unit 33 is adapted for controlling the first and the second actuating device 19, 25. The reading light control unit 33 further comprises an interface for connecting the reading light assembly 1 to a reading light system of a vehicle. Embodiments of such an interface will be described in more detail with reference to FIGS. 5 to 7. Thus, the control unit 33 can, for example, receive signals from a user control which are then translated into discrete signals for the step motors 21, 27 which then rotate or tilt the lamp housing 7 as requested.

In addition, the reading light assembly 1 comprises a sensor 35 for determining a position of a seat to be illuminated or lighted by the reading light assembly 1. The sensor 35 is, for example, an ultrasound sensor or an optical sensor. The position of the seat can, for example, be directly determined by the sensor 35 or from signals sent from the sensor 35 to the reading light control unit 33 or a central control unit of a reading light system to which the reading light assembly 1 is connected. By determining a position of a seat to be lighted by the reading light assembly 1 using the sensor 35 advantageously an automated adjustment of the reading light assembly 1 is possible. The default position can simply be determined using the sensor 35. Otherwise, the default position has to be predetermined and permanently stored either in the reading light control unit 33 or a central control unit of a reading light system of which the reading light assembly 1 is a part.

Figure 3:
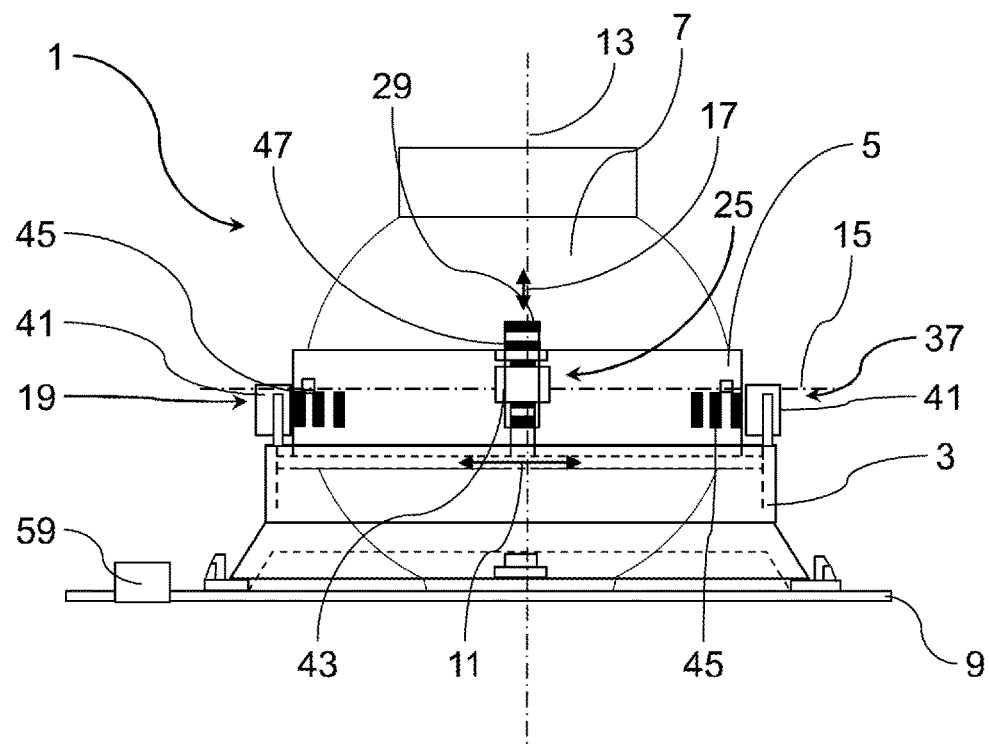
FIG. 3 shows a schematic side view of a second exemplary embodiment of a reading light assembly according to the present invention.
Figure 4:
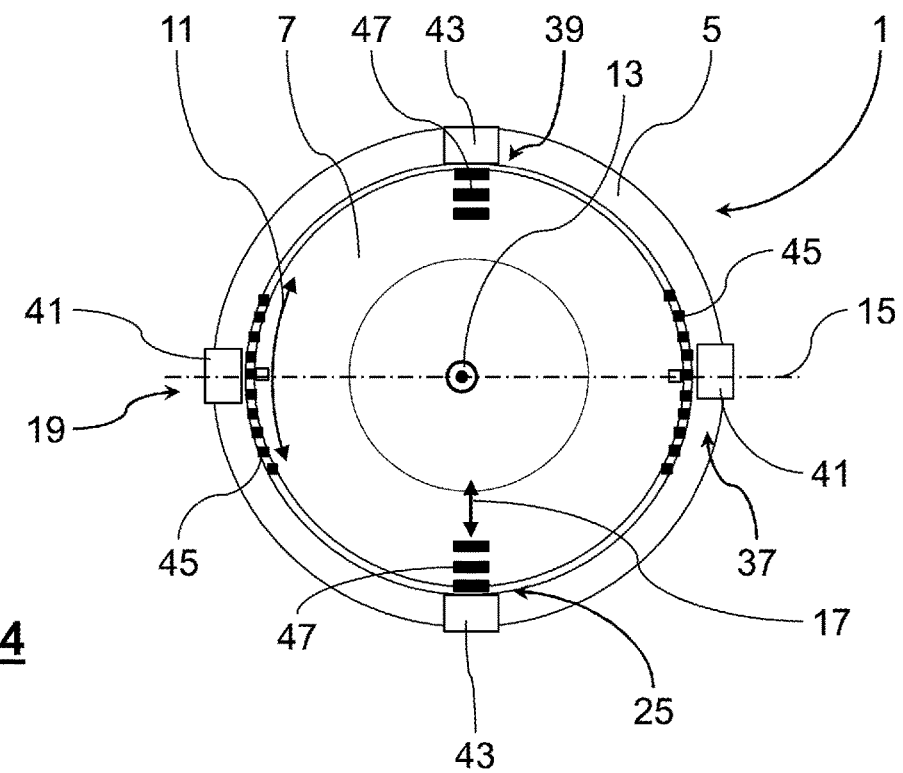
FIG. 4 shows a schematic top view of the reading light assembly of FIG. 3.

A second exemplary embodiment of a reading light assembly 1 according to the present invention is shown in FIGS. 3 and 4. Only those elements of the reading light assembly 1 shown in FIGS. 3 and 4 will be described in more detail that differ from the reading light assembly 1 shown in FIGS. 1 and 2.

The reading light assembly 1 of FIGS. 3 and 4 differs in particular in the number and the embodiment of the actuating devices. The exemplary embodiment comprises, in addition to the first actuating device 19 and the second actuating device 25, a third and a fourth actuating device 37, 39. The third actuating device 37 is also provided for rotating the spacer ring 5 about the first axis 13. Likewise, the fourth actuating device 39 is provided for tilting the lamp housing 7 with respect to the spacer ring 5 about the second axis 15. Thus, each of the actuating device 19, 25, 37, 39 needs to provide less torque to rotate or tilt the lamp housing 7 with respect to the mounting element 3.

The actuating devices 19, 25, 37, 39 further differ from the actuating devices of the embodiment shown in FIGS. 1 and 2 in that no mechanical elements are required for rotating the lamp housing 7. To this end each of the actuating devices 19, 25, 37, 39 comprises a coil 41, 43 and a plurality of magnetic strips 45, 47.

The rotation coil 41 which is part of the actuating devices 19, 37 for rotating the spacer ring 5 with respect to the mounting element 3 is firmly attached to the mounting element 3. Adjacent to the rotation coils 41 the magnetic strips 45 are attached to the spacer ring 5 which is of a circular shape in a plane extending perpendicular to the first axis 13 about which the spacer ring 5 rotates. The magnetic strips 45 are of alternating polarity, such that by applying an alternating current to the rotation coil 41 the spacer ring 5 can be rotated with respect to the mounting element 3. Thus, the rotation coils 41 and the magnetic strips 45 essentially form an electric motor, where the magnetic strips 45 form the permanent magnet and the rotation coils 41 forms the alternating magnet. In the embodiment shown in FIGS. 3 and 4, a first and a third actuating device 19, 37 are provided for rotating the spacer ring 5 together with the lamp housing 7 about the first axis 13. It is, however, also conceivable that only one of the first and the third actuating devices 19, 37 is provided for rotating the spacer ring 5.

Likewise, the second and the fourth actuating device 25, 39 are each formed by a tilting coils 43 and magnetic strips 47. The tilting coil 43 is firmly attached to the spacer ring 5 and the magnetic strips 47 are firmly attached to the lamp housing 7. The second and the fourth actuating device 25, 39 operate in the same manner as the first and the third actuating device 19, 37. Thus, regarding a more detailed description of their operation reference is made to the preceding paragraph.

Providing the actuating devices 19, 25, 37, 39 as shown in the second embodiment in FIGS. 3 and 4 is particularly advantageous as no mechanical parts are required and, thus, the reading light assembly requires less maintenance. Using the actuating devices 19, 25, 37, 39 of FIGS. 3 and 4 is only possible as rotating the lamp housing 7 and the spacer ring 5 requires only very little torque.

Finally, with respect to FIGS. 5 to 7 three different exemplary embodiments of reading light systems 49 will be described. These reading light systems 49 are intended for use in an aircraft which is not shown in the FIGS. 5 to 7. However, a similar or identical reading light system may also be used for other vehicles such as buses or trains. Each of the reading light systems 49 comprises a plurality of reading light assemblies 1 according to the present invention. Only four reading light assemblies 1 are shown for each reading light system 49. However, the reading light systems 49 comprise more than four reading light assemblies 1.

Figure 5:
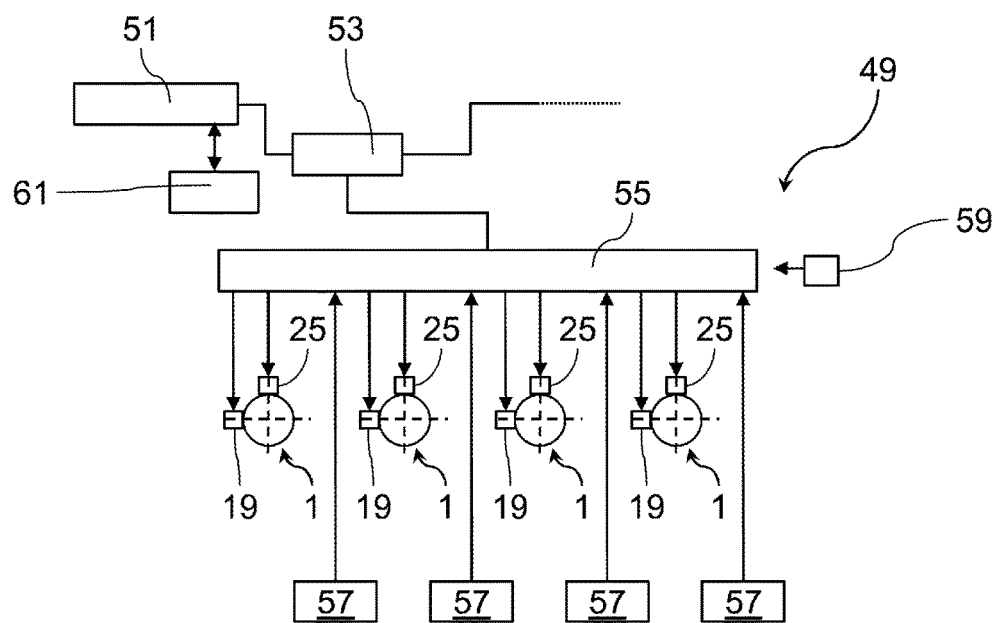
FIG. 5 shows a schematic representation of a first exemplary embodiment of a reading light system according to the present invention.

The first exemplary embodiment of a reading light system 49 is shown in FIG. 5. The reading light system 49 comprises a central control unit 51 which can be part of a general control system for a passenger cabin of the vehicle, such as a director system of an aircraft. However, the central control unit 51 can also be implemented as a separate entity, for example, in form of a computer. The central control unit 51 is functionally connected via a bus system through data distribution units 53 with local reading light adjustment control units 55. The bus system can be a dedicated bus system for vehicles. However, in an exemplary preferred embodiment the bus system is an Ethernet network. In FIG. 5 only one data distribution unit 53 and only one local reading light adjustment control unit 55 are shown. However, the actual embodiment of the reading light system 49 comprises one reading light adjustment control unit 55 for each group of seats in a row. For example, in a single aisle aircraft two reading light adjustment control units 55 would be installed per row of seats. Likewise, in a twin aisle aircraft, three reading light adjustment control units 55 would be installed per row of seats. The reading light adjustment control units 55 are part of the PSUs that are installed overhead the seats.

The reading light adjustment control unit 55 shown in FIG. 5 is connected to four reading light assemblies 1. However, other numbers of reading lights can be connected to a reading light adjustment control unit 55, e.g., two, three or more reading lights. The connection is established directly with the actuating devices 19, 25. Thus, the reading light adjustment control unit 55 directly controls the operation of each of the actuating devices 19, 25 of each reading light 1. To this end the reading light adjustment control unit 55 transmits discrete pulses to each of the actuating devices 19, 25, wherein each pulse rotates the lamp housing of the respective reading lights 1 about a predefined angle with respect to the first axis or tilts the lamp housing about a predefined angle with respect to the second axis.

The reading light system 49 shown in FIG. 5 comprises, for each reading light 1, a user control 57. The user control 57 enables a passenger sitting on a seat which is illuminated by a respective reading light 1 to change the direction of the light emitted by the reading light 1. The input of the passenger into the user control 57 is translated by the reading light adjustment control unit 55 into discrete pulses that are transmitted to the respective actuating devices 19, 25. To this end the reading light adjustment control unit 55 comprises a processing unit and other necessary components.

Further connected to the reading light adjustment control unit 55 is a sensor 59 for determining a position of each seat to be lighted by one of the reading light assemblies 1. The sensor 59 is, for example, an ultrasound sensor or an optical sensor. From the information received from the sensor 59, the reading light adjustment control unit 55 can determine for each of the reading light assemblies 1, a default position or default orientation of the lamp housing of each reading light assembly 1. This can, for example, be a position in which the reading light 1 is exactly centered on to the seating area of the seat to be illuminated by the respective reading light 1.

The central control unit 51 is adapted to send a reset signal to all of the reading light adjustment control units 55 of the reading light system 49, such that all reading light assemblies 1 of the reading light system 49 are automatically moved to their default position. To initiate the sending of such a reset signal, the central control unit 51 is connected to a control panel 61 which is in the exemplary embodiment shown FIGS. 5 to 7 a flight attendant panel (FAP). The FAP can also be used to adjust the position of the reading light assemblies 1 the first time after they have been installed or the reading light system 49 has undergone maintenance.

Figure 6:
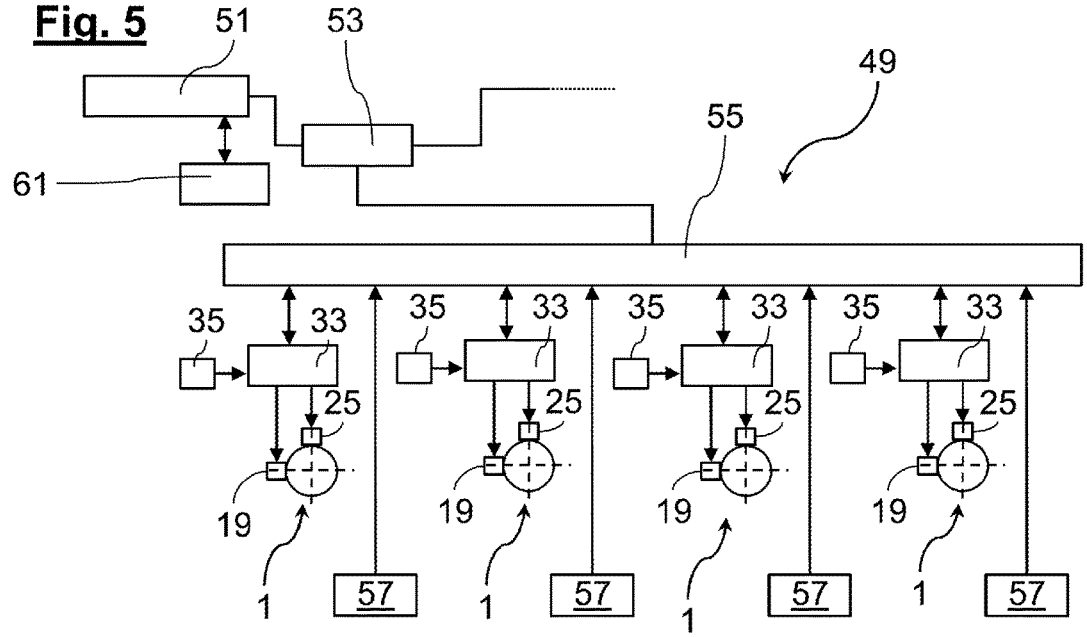
FIG. 6 shows a schematic representation of a second exemplary embodiment of a reading light system according to the present invention and FIG. 7 shows a schematic representation of a third exemplary embodiment of a reading light system according to the present invention.

In FIG. 6 a second embodiment of a reading light system 49 is shown. Only the differences relative to the reading light system 49 shown in FIG. 5 will be described in more detail here.

In the reading light system 49 shown in FIG. 6, each reading light assembly 1 comprises a separate reading light control unit 33 and each reading light control unit 33 is in turn directly connected to a sensor 35. The reading light assemblies 1 shown in FIG. 6 have been described in detail with reference to FIGS. 1 and 2. Therefore, a detailed description will be omitted.

The reading light system 49 differs in that the reading light adjustment control unit 55 only needs to distribute the signals from the central control unit 51 to each of the reading light control units 33 of the respective reading lights. These reading light control units 33 are adapted to move the lamp housings 7 according to signals received from a central control unit 51 to a reset position determined using a sensor 35, 59. In addition to the advantages of the reading light system 49 shown in FIG. 5, in the reading light system 49 shown in FIG. 6, each reading light assembly 1 can be easily exchanged for another reading light assembly 1 as long as it adheres to a communication protocol for communicating with the reading light adjustment control unit 55 and the central control unit 51. Thereby, reading light assemblies 1 can be easily exchanged or upgraded as neither the reading light adjustment control units 55 nor the central control unit 51 has to be adapted for specific reading lights 1.

Figure 7:
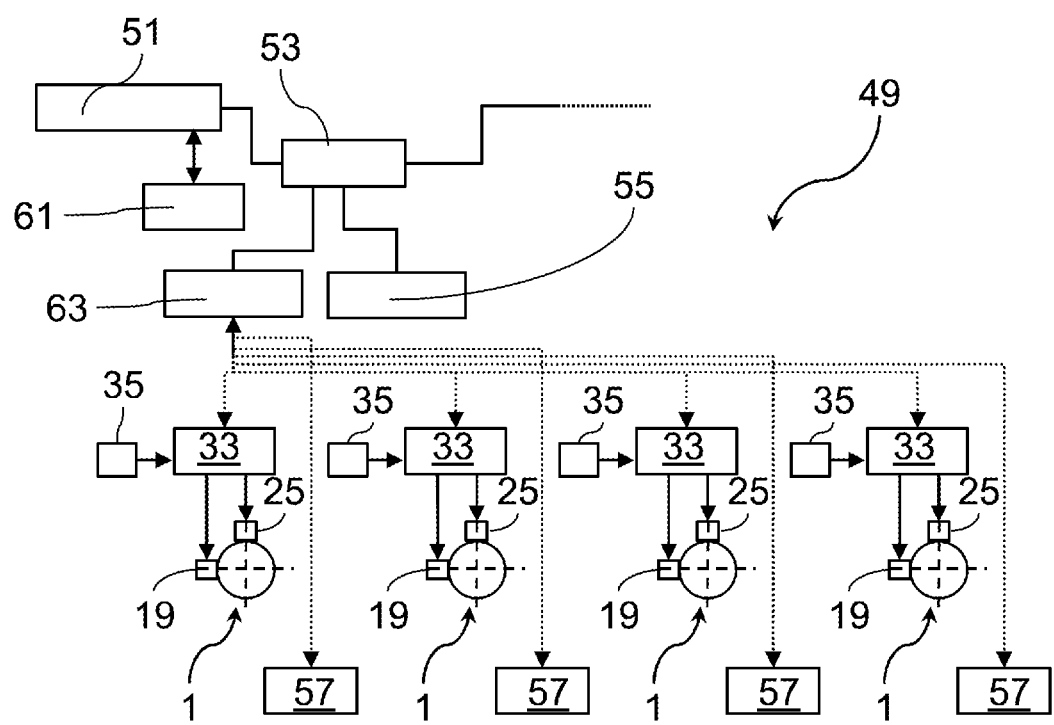

A third embodiment of a reading light system 49 is shown in FIG. 7. The reading light system 49 differs from the reading light control system shown in FIG. 6 only in that instead of providing wired connections between the reading light adjustment control unit 55 and each of the reading light assemblies 1 a wireless router 63 is provided which provides a wireless connection between the reading light assemblies 1, the user control 57 and the remainder of the system 49. By using a wireless system for transmitting data or signals from the central control unit 51 or the user control 57, additional wiring is omitted which reduces the weight of the reading light system 49 and further makes it easier to install the system 49 as the different parts of the system 49 only have to be attached to a power supply but not additionally to a system for transmitting signals between the different parts of the system 49.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A reading light assembly for a vehicle comprising a mounting element and a lamp housing, wherein the mounting element mounts the reading light assembly in a vehicle,
    wherein the lamp housing includes a light source and is mounted to the mounting element such that the lamp housing is rotatable about a first axis with respect to the mounting element and tiltable about a second axis with respect to the mounting element,
    wherein the reading light assembly comprises a first actuating device to rotate the lamp housing about the first axis and a second actuating device to tilt the lamp housing about the second axis,
    wherein the first and second actuating devices are electrically powered;
    wherein the reading light assembly comprises at least one reading light control unit,
    wherein the reading light control unit controls the first and second actuating devices to rotate the lamp housing about the first axis or tilt the lamp housing about the second axis,
    wherein the reading light assembly comprises an interface for connecting the reading light assembly to a central control unit of a reading light system for the vehicle, wherein the interface accepts and transmits a reset command, and
    wherein when the reset command is received by the reading light assembly via the interface, the at least one reading light control unit controls the first and second actuating devices to reset the orientation of the lamp housing to a default position,
    wherein reading light assembly comprises a sensor, wherein the sensor determines a position of a seat to be lighted by the reading light assembly.

2. A reading light assembly according to claim 1, wherein the reading light assembly comprises a spacer ring mounting the lamp housing to the mounting element,
    wherein the first actuating device rotates the spacer ring about the first axis, whereby the lamp housing is rotated about the first axis, and
    wherein the second actuating device tilts lamp housing with respect to the spacer ring about the second axis.

3. A reading light assembly according to claim 2, wherein the reading light assembly comprises a third and a fourth actuating device, wherein the third actuating device rotates the lamp housing about the first axis and the fourth actuating device tilts the lamp housing about the second axis.

4. A reading light assembly according to claim 2, wherein at least one of the first and the third actuating device is formed by a rotation coil and a plurality of magnetic strips, wherein the rotation coil is firmly attached to one of the mounting element and the spacer ring and the magnetic strips are firmly attached to the other of the mounting element and the spacer ring,
    wherein the reading light assembly is configured such that an alternating magnetic field to rotate the spacer ring about the first axis is generated via the rotation coil or the rotation coils.

5. A reading light assembly according to claim 2, wherein at least one of the second and the fourth actuating device comprises a tilting coil and a plurality of magnetic strips, wherein the tilting coil is firmly attached to one of the spacer ring and the lamp housing and the magnetic strips are firmly attached to the other of the spacer ring and the lamp housing, wherein the reading light assembly generates an alternating magnetic field to tilt the lamp housing about the second axis with the tilting coil.

6. A reading light assembly according to claim 1, wherein at least one actuating device is formed as an electrically powered step motor.

7. A reading light assembly according to claim 1, wherein the lamp housing has an at least partially spherical form.

8. A reading light assembly according to claim 1, wherein the sensor generates a signal to one of the reading light control unit and the central control unit to effect an automated adjustment of the reading light assembly.

9. An aircraft comprising a reading light system comprising:

a plurality of reading light assemblies, each reading light assembly associated with a discrete seat location within the aircraft and comprising a mounting element and a lamp housing, wherein each mounting element mounts each reading light assembly in the aircraft, wherein each lamp housing includes a light source and is mounted to the mounting element such that each lamp housing will rotate about a first axis with respect to the mounting element and will tilt about a second axis with respect to the mounting element, wherein each leading light assembly comprises a first actuating device to rotate the lamp housing about the first axis and a second actuating device to tilt the lamp housing about the second axis, wherein the first and second actuating devices are electrically powered;

wherein each reading light assembly comprises a reading light control unit, wherein each reading light control unit controls the first and second actuating devices to rotate the lamp housing about the first axis or tilt the lamp housing about the second axis, a central control unit electronically coupled to each reading light assembly in the plurality of reading light assemblies, wherein each reading light assembly comprises an interface, which connects a corresponding reading light assembly to the central control unit, each interface accepting a reset command from the central control unit and transmitting the reset command to the corresponding reading light assembly such that the central control unit is controls each first and second actuating device of each reading light assembly to rotate the lamp housing of the respective reading light assembly about the first axis or to tilt the lamp housing of the respective reading light assembly about the second axis, and wherein a single reset command initiated at the central control unit is received by each reading light assembly via the interface, causing the first and second actuating devices of each reading light assembly in the plurality of reading light assemblies to respond to the single rest command to reset the orientation of the lamp housing to a default position.

10. A reading light assembly for a vehicle comprising:

a mounting element and a lamp housing, wherein the mounting element mounts the reading light assembly in a vehicle;

wherein the lamp housing includes a light source and is mounted to the mounting element such that the lamp housing is rotatable about a first axis with respect to the mounting element and tiltable about a second axis with respect to the mounting element, wherein the reading light assembly comprises a first actuating device to rotate the lamp housing about the first axis and a second actuating device to tilt the lamp housing about the second axis, wherein the first and second actuating devices are electrically powered;

wherein the reading light assembly comprises at least one reading light control unit, wherein the reading light control unit controls the first and second actuating devices to rotate the lamp housing about the first axis or tilt the lamp housing about the second axis, wherein the reading light assembly comprises an interface for connecting the reading light assembly to a central control unit of a reading light system for the vehicle, wherein the interface accepts and transmits a reset command, wherein reading light assembly further comprises a sensor, the sensor determining a position of a seat in the vehicle to be lighted by the reading light assembly and generating a signal to one of the reading light control unit and the central control unit to effect an automated adjustment of the reading light assembly.

* * * * *